May 19, 1959 A. F. BISCHOFF 2,887,580
VARIABLE OUTPUT CONTROL FOR LINEAR ACCELERATORS
Filed April 26, 1957

INVENTOR:—
ALFRED F. BISCHOFF
BY:—
Junius F. Cook, Jr.
ATTORNEY

United States Patent Office
2,887,580
Patented May 19, 1959

2,887,580
VARIABLE OUTPUT CONTROL FOR LINEAR ACCELERATORS

Alfred F. Bischoff, Elm Grove, Wis., assignor to General Electric Company, a corporation of New York Application April 26, 1957, Serial No. 655,206

5 Claims. (Cl. 250—36)

The present invention relates in general to electronics, and has more particular reference to electromagnetic wave guides, the invention pertaining especially to apparatus for producing high frequency energy waves and introducing the same into a wave guide, such as a linear accelerator, or other wave confining means, while controlling the same to obtain a regulated energy output from the wave guide.

Wave guiding means of the sort here contemplated are adapted to receive electrons at relatively low velocity, to accelerate the received electrons to high energy levels, and to deliver the accelerated electrons from the guide either as high velocity electrons or as X-rays. It is desirable that the wave guide deliver electrons at uniform energy and power levels at each selected setting of the controls. The output of the wave guide may be continuously monitored to determine its voltage and power levels, and these monitor signals may be employed to operate a regulating system for correcting the frequency of power supplied to the wave guide and pulse rate for the operation thereof; and the electron energy and power delivered from the guide may thus be optimized.

Since electron energy supplied to the wave guide may embody two or more variable factors, the optimizing of output energy is somewhat difficult due to the necessity of controlling both the pulse rate and frequency of input energy to the guide. When frequency differs appreciably from optimum frequency, output energy may change so rapidly as to make impossible a sufficiently rapid increase in pulse rate of input energy to maintain a desired optimum output energy level.

An important object of the present invention is to provide means for and a method for continually optimizing input energy frequency to a wave guide as the pulse rate is adjusted to permit output power to be maintained at a satisfactory level; a further object being to provide for continuously varying the frequency of an oscillator circuit over a limited range and to monitor wave guide output energy by circuit means responsive to the optimum frequency.

Another object of the invention is to provide for combining a variation in the frequency of a wave guide energy supply circuit with that of the output of the wave guide, as sensed by a suitable monitoring circuit, whereby to develop an error voltage adapted for application in correcting the frequency of energy supplied to the wave guide and for maintaining the output power at a satisfactory level.

Briefly stated, a pulsed radio frequency power supply system is employed to introduce energy into a wave guide, such frequency being controlled by a frequency adjusting circuit; and the output energy of the wave guide is continuously measured or monitored. A mixing circuit operates to combine a control impulse corresponding with the frequency of the measured output energy level with an impulse corresponding with the frequency variation of the power supply. The resultant impulse is then applied to the frequency adjusting circuit to correspondingly correct the frequency of wave guide input energy, while pulse rate is simultaneously adjusted in response to monitored changes in wave guide output power, in order to maintain output power at a desired level.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Figure 1:
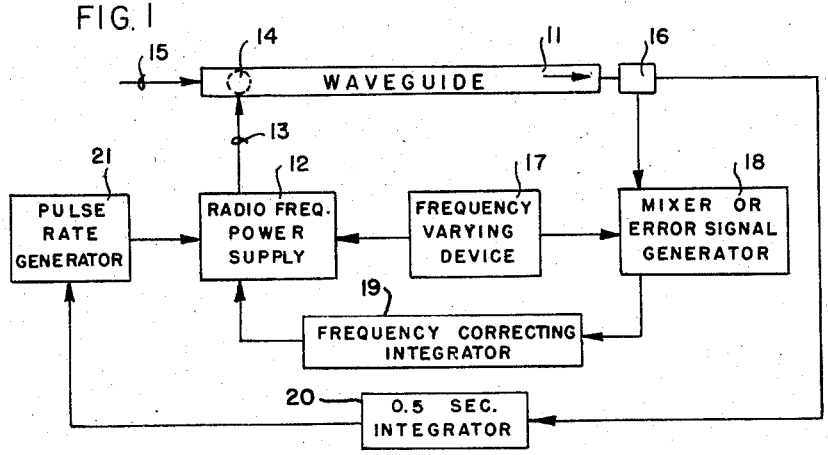
Fig. 1 is a diagrammatic representation of a control system embodying the present invention.

To illustrate the invention the drawings show a wave guide 11 which may conveniently comprise a conventional linear accelerator. Such a device may consist of a hollow tube into which an electrical energy wave may be introduced from a suitable radio frequency power supply 12, as indicated by the arrow 13. The power supply 12 may conveniently embody a high frequency oscillator, such as a Magnetron or a Klystron. The radio frequency energy wave may be delivered into the wave guide 11, as by means of a conventional doorknob coupler 14. The wave guide provides means for conducting radio frequency energy waves, which are of electromagnetic character, in fashion somewhat analogous to the transmission of electrical current by means of a conductor wire.

When employed as a linear accelerator, the wave guide is adapted to receive electrons injected, at one end, at relatively low velocity of the order of, say, 0.4c, that is to say $\frac{4}{10}$ the speed of light, as indicated by the arrow 15. Electrons thus introduced into the wave guide may be supplied from any suitable or preferred source, such as a hot cathode or other electron emitting device. When in operation, the accelerator functions to increase the phase velocity of the electromagnetic wave and electrons entrained therewith, to speeds of the order of slightly less than the speed of light. The design of the wave guide is such that electrons injected at one end at relatively low veolcity will be accelerated at high energy before they emerge from the delivery end of the guide, either as high energy electrons or as X-rays. To be useful, the apparatus should have a constant output for any particular setting of its controls. The output can be kept constant by monitoring it and varying the pulse rate of the radio frequency power source 12 in order to maintain a constant average output, intergration time approximately one second.

This can be accomplished by suitable monitoring means 16 of conventional character for measuring the output of the wave guide. However, radio frequency of the input energy wave is another factor which grossly affects the output of the accelerator. If the radio frequency differs from optimum frequency, the output falls off rapidly due to change of phase velocity in the wave guide. Because of this effect, it may be impossible to increase the pulse rate of the wave sufficiently to obtain the desired output, whereby output regulation will be ineffective. The present invention, however, provides for continuously optimizing the radio frequency of the energy wave supplied to the accelerator as its pulse rate is adjusted to provide the required output, whereby satisfactory regulation is obtained.

Accordingly, suitable frequency varying means 17 of any suitable, preferred or conventional character is provided for continuously varying the frequency of the wave delivered by the supply source 12, frequency being thus varied over a limited range of the order of 0.1 to 0.2 mc., with the radio frequency at about 3000 mc./sec. The response of the output monitor 16, accordingly, will be characterized by the relationship of the operating frequency to the optimum frequency.

Figure 2:
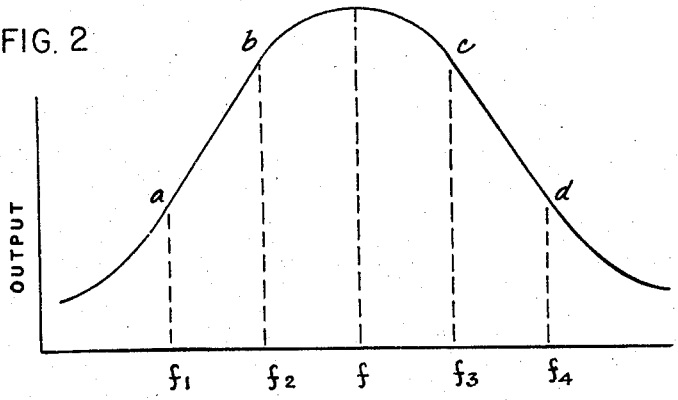
Fig. 2 is a graphic representation showing the variation of the output of a linear accelerator in response to changes in frequency.
Figure 4:
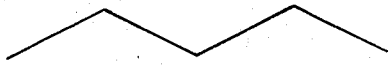
Figure 5:

As shown more particularly in Fig. 2, the output from the linear accelerator varies with frequency. If, for example, frequency is varied between $f_1$, corresponding to point $a$ on the output curve, and $f_2$, corresponding with point $b$ on the output curve, the output will vary approximately linearly with frequency, being a maximum at $f_2$ and a minimum at $f_1$, as shown in Fig. 4. Where frequency is varied between $f_2$ and $f_3$, the output is no longer linear with frequency, but reaches a maximum midway between $f_2$ and $f_3$, being at minimum values at $f_2$ and also at $f_3$, as shown in Fig. 5. Likewise, it can be seen that varying the frequency between $f_3$ and $f_4$ will produce linear variation similar to that produced in response to frequency variation between $f_1$ and $f_2$ but of opposite sign, since increase in frequency between $f_3$ and $f_4$ results in a decrease in output, as shown in Fig. 6.

Figure 3:
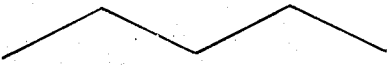
Figs. 3, 4, 5 and 6 illustrate changes in the output of a linear accelerator in response to cyclic variations in frequency between selected frequency values.
Figure 6:
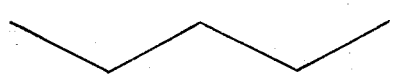

It will be seen that the addition of the values shown in Figs. 3 and 4 will produce a large function; that the addition of the values shown in Figs. 3 and 5 will produce a function of medium size; and that the values shown in Figs. 3 and 6, being equal and of opposite sign, will become mutually cancelled when added together. If these summation functions are rectified and averaged, it will be seen that a large direct current voltage may be derived from the summation of values shown in Figs. 3 and 4, while substantially zero voltage will be derived as a result of the mutual cancellation of values shown in Figs. 3 and 6, intermediate voltage values being derived at intermediate frequency scan positions. Voltages thus derived have a relation to frequency and can be used to effect the necessary frequency correction such that the required frequency variation may be caused to occur approximately at the medial frequency midway between $f_2$ and $f_3$.

If the pulse rate is always maintained at frequencies of, say, more than 70 p.p.s., then the frequency can be varied at a rate of the order of ten times per second, which will allow seven pulses for integration, which is entirely adequate. Where the variation in pulse repetition rate is based upon the integrated output over a period of more than 0.1 second, say, 0.5 second, for example, the momentary variation in frequency will not affect the integrated or average output in fashion such that the pulse repetition varying equipment will attempt to compensate.

The foregoing objective may be accomplished by providing a mixer or error signal generator 18 of suitable or preferred character for receiving impulses from the output detector or monitor 16. The mixer also is connected to receive the control frequency from the frequency varying device 17, whereby to add together the signal frequencies received from the devices 16 and 17 to produce a combined signal for delivering through a frequency correcting network 19 to regulate the frequency of the power supply 12. If the output of the detector is at the optimum value corresponding with the range on the curve of Fig. 2 between points $b$ and $c$, a corresponding direct current value is passed to the correcting network 19 to hold frequency steady in the power supply 12. If the output of the detector 16 is a maximum, corresponding with an output within the range between $a$ and $b$ on the curve in Fig. 2, a relatively large direct current signal will be passed to the correcting network 19 to increase the frequency of the power supply 12, the system operating to decrease frequency of the power supply when the detector 16 passes a zero voltage signal corresponding with wave guide output in the range between $c$ and $d$ on the curve in Fig. 2.

The detector 16 may also be controllingly connected through an integrator system 20 with a pulse rate generator 21, which in turn is controllingly connected with the power supply 12. The pulse rate generator may conveniently comprise a multivibrator which operates to supply a pulse rate to the power supply system 12, in order to cause the same to operate in response to the application of the control bias. The integrating system 20 may embody a resistor and condenser selected to provide a desired timing interval by altering the charge on the condenser at a controlled rate, so as to pass the average change trend of the voltage level, delivered by the output detector 16, whereby to control the pulse rate generator 21 in accordance with such average change and not in response to momentary changes.

It is not intended that the present invention be limited by the method of deriving an error signal by the addition of output wave forms, as described above, since, by increasing the frequency deviation so that the wave guide output varies between $a$ and $c$ on the curve in Fig. 2, other equally effective intelligence signals may be derived. It would likewise be possible to derive an optimum frequency indication by determining the frequency which produces the maximum second harmonic of the frequency varying function.

It is also obvious that the herein contemplated double frequency signal, which is phase sensitive, could be resolved by conventional methods into a control signal, as by use of any one of a number of techniques, including that employing the phase sensitive detector.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A system for loading a wave guide with high frequency energy comprising a radio frequency generator coupled with said guide, frequency varying means controllingly connected with said generator, monitoring means connected with the wave guide for measuring the energy load therein, mixing means connected with the monitoring means and with the frequency varying means for developing a differential error signal, said mixing means being controllingly connected with the radio frequency generator to adjust the generated frequency in accordance with the error signal.

2. A system as set forth in claim 1, wherein said frequency varying means is operable to repetitively vary the frequency of the generator between maximum and minimum limits.

3. A system as set forth in claim 1, including a frequency correcting network controllingly connecting the mixing means with said frequency generator.

4. A system for loading a wave guide with high frequency energy comprising a radio frequency generator coupled with said guide, frequency varying means controllingly connected with said generator, said frequency varying means including means operable to repetitively vary the frequency of said generator between maximum and minimum limits, monitoring means connected with the wave guide for measuring the energy load therein, mixing means connected with the monitoring means and with the frequency varying means for developing a differential error signal, said mixing means being controllingly connected with the radio frequency generator through a frequency correcting network to adjust the generated frequency in accordance with the error signal.

5. A system for loading a wave guide with high frequency energy comprising a radio frequency generator coupled with said guide, frequency varying means controllingly connected with said radio frequency generator, a pulse rate generator controllingly connected with said radio frequency generator to determine the pulse rate of energy supplied to the guide by said radio frequency generator, monitoring means connected with the wave guide for measuring the energy load therein, said monitoring means being controllingly connected with said pulse rate generator to regulate the same in accordance with changes in the energy load of the wave guide as determined by the monitoring means, mixing means connected with the monitoring means and with the frequency varying means for developing a differential error signal, said mixing means being controllingly connected with the radio frequency generator to adjust the generated frequency in accordance with the error signal.

References Cited in the file of this patent

UNITED STATES PATENTS

| | | |
|---|---|---|
| 2,462,857 | Ginzton et al. | Mar. 1, 1949 |
| 2,677,058 | Kirkman | Apr. 27, 1954 |
| 2,681,998 | Pound | June 22, 1954 |
| 2,748,384 | Crane et al. | May 29, 1956 |